United States Patent [19]
Holze

[11] Patent Number: 5,529,399
[45] Date of Patent: Jun. 25, 1996

[54] JOURNAL-THRUST BEARING ASSEMBLY

[75] Inventor: Gunther Holze, Hannover, Germany

[73] Assignee: Renk Aktiengesellschaft, Augsburg, Germany

[21] Appl. No.: 326,765

[22] Filed: Oct. 20, 1994

[30] Foreign Application Priority Data

Oct. 28, 1993 [DE] Germany ............ 43 36 915.4

[51] Int. Cl.⁶ ............ F16C 32/06; F16C 27/02; F16C 33/10
[52] U.S. Cl. ............ 384/107; 384/223; 384/286; 384/295; 384/420
[58] Field of Search ............ 384/107, 121, 384/125, 223, 228, 248, 276, 282, 286–290, 294, 295, 296–300, 302, 303, 368, 420

[56] References Cited

U.S. PATENT DOCUMENTS

| | | | |
|---|---|---|---|
| 2,179,860 | 11/1939 | Panzegrau et al. | 384/368 |
| 2,850,334 | 9/1958 | Hurley | 384/294 |
| 2,872,256 | 2/1959 | Thomson | 384/420 |
| 3,043,636 | 7/1962 | MacInnes et al. | 384/287 |
| 3,544,179 | 12/1970 | De Leu | 384/368 |
| 4,348,065 | 9/1982 | Yoshioka et al. | 384/121 |
| 4,362,341 | 12/1982 | Matsumoto et al. | 384/286 x |
| 4,362,343 | 12/1982 | Visser | 384/297 X |
| 4,770,547 | 9/1988 | New | 384/420 X |

FOREIGN PATENT DOCUMENTS

| | | | |
|---|---|---|---|
| 1039789 | 9/1958 | Germany | 384/303 |
| 1675076 | 8/1968 | Germany . | |
| 4041557 | 12/1990 | Germany . | |
| 172012 | 7/1988 | Japan | 384/420 |
| 289231 | 3/1971 | U.S.S.R. . | |
| 1370336 | 8/1986 | U.S.S.R. . | |
| 201459 | 8/1923 | United Kingdom | 384/303 |
| 604196 | 1/1945 | United Kingdom . | |
| 1453950 | 4/1976 | United Kingdom . | |
| 2005360 | 4/1979 | United Kingdom . | |

OTHER PUBLICATIONS

Schmon, Auslegung und Betrieb von Radial–Axialbund Gleitlagern, Konstruktion 41, (1981) pp. 89–94.
Gleitlager für Radiale und Axiale Belastung, Fertigungstechnik und Betrieb 22, (1972) p. 58.

Primary Examiner—Thomas R. Hannon
Attorney, Agent, or Firm—Natter & Natter

[57] ABSTRACT

A combined journal-thrust bearing assembly includes a bearing body formed of upper and lower sections secured together at an axial plane. To the axial ends of the bearing body, thrust rings are removably mounted with the thrust rings also being formed of segments, the ends of which lie in the axial plane. Extending through a bore defined by the bearing face of a journal liner is a rotating shaft having a pair of spaced collars. The collars abut bearing faces of the thrust rings to prevent axial movement of the shaft relative to the bearing assembly. Disassembly of the bearing body about the axial plane facilitates repair or replacement of the bearing body sections, the liner, or worn thrust rings independently of one another. An oil delivery system is also provided for lubricating the interface between the shaft and the journal bearing face as well as lubricating the interface between the thrust bearing faces and the shaft collars.

17 Claims, 3 Drawing Sheets

JOURNAL-THRUST BEARING ASSEMBLY

BACKGROUND OF THE INVENTION

1. Field of the Invention

This invention relates generally to bearings for carrying rotating shafts and more particularly to a combination journal and thrust bearing assembly.

2. Related History

The support of rotating shafts subject to axial loads has presented significant problems. While sleeve bearings have provided a relatively low cost, efficient and easily serviceable approach for supporting shafts which were relatively free of axial stress or loads, journal bearings alone were incapable of restraining a rotating shaft against axial movement.

Combination journal and thrust bearing assemblies heretofore were generally custom designed for each application and were formed of one piece including a sleeve for accommodating radial load forces with a unitary transverse flange for axial loads. A typical example is illustrated in the article appearing in *Konstruktion* 41, (1989) by Schmon, et al. entitled: *Auslegung Und Betrieb yon Radial-Axialbund-Gleitlager* pp. 89–94, FIG. 1 at p. 90. A further example of a combined journal and thrust bearing is illustrated in Soviet Union patent 1,370,336. By utilizing the same bearing material in a one piece bearing for both the radial load portion and the axial load portion of the bearing, inherent disadvantages resulted. For example, should one of the two bearing load components wear before the other, the entire bearing was required to be replaced.

The normal load carrying capacity of a bearing, expressed as a PV factor (pressure times surface velocity) of a journal bearing was generally four to five times greater than the PV factor for the same bearing material employed as a thrust bearing. If the same material was utilized for both bearing applications in a one piece bearing, the bearing was often overdesigned for one of its two functions.

The inventor perceived a need for a combined journal and thrust bearing wherein bearing materials suitable for the anticipated radial and axial loads are separately selected and wherein the journal bearing components may be replaced independently of the thrust bearing components and the thrust bearing components may be replaced independently of the journal bearing components.

SUMMARY OF THE INVENTION

A combined journal-thrust bearing assembly includes a bearing body carrying a journal liner. The body is formed of upper and lower sections secured together about a horizontal axial plane. An axial thrust ring is removably mounted to each of the outer faces of the bearing body. Each thrust ring is formed of segments, the ends of which lie in a horizontal axial plane. A rotating shaft extends through a bore defined by the bearing face of a journal bearing sleeve liner and a pair of collars, fixed to the shaft, abut the outer bearing faces of the thrust rings.

A suitable oil delivery system is provided for lubricating the bearing face of the journal bearing and for lubricating the bearing face of each thrust ring.

Disassembly of the bearing body permits easy repair or replacement of the bearing body sections, the liner, or replacement of worn thrust rings.

From the foregoing compendium, it will be appreciated that it is an aspect of the present invention to provide a journal-thrust bearing assembly of the general character described which is not subject to the disadvantages of the related history aforementioned.

A consideration of the present invention is to provide a journal-thrust bearing assembly of the general character described which is well suited for economical mass production fabrication.

A feature of the present invention is to provide a journal-thrust bearing assembly of the general character described which facilitates simple repair or replacement of any one component without necessitating replacement of the entire assembly.

A further aspect of the present invention is to provide a journal-thrust bearing assembly of the general character described which achieves optimum efficiency through utilization of different bearing materials compatible with different bearing loads to which the bearing assembly is subject.

An additional feature of the present invention is to provide a journal-thrust bearing assembly of the general character described which is relatively small in overall size yet is capable of withstanding relatively large bearing load forces.

Another consideration of the present invention is to provide a journal-thrust bearing assembly of the general character described wherein parts subject to wear can be economically replaced independently of each other.

To provide a journal-thrust bearing assembly of the general character described which may be fabricated with but a modicum of structural components is a still further aspect of the present invention.

Another feature of the present invention is to provide a journal-thrust bearing assembly of the general character described which is well adapted for high efficiency applications with forced circulation of lubricating oil.

An additional consideration of the present invention is to provide a journal-thrust bearing assembly of the general character described which may be employed in high speed and heavy load conditions while accomplishing both size and weight reductions.

A still further feature of the present invention is to provide a journal-thrust bearing assembly of the general character describe with a relatively long useful life.

Other aspects, features and considerations of the present invention in part will be obvious and in part will be pointed out hereinafter.

With these ends in view, the invention finds embodiment in the various combinations of elements and arrangements of parts and series of steps by which the said aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings, in which are shown some of the various possible exemplary embodiments of the invention.

DESCRIPTION OF THE PREFERRED EMBODIMENTS

Figure 1:
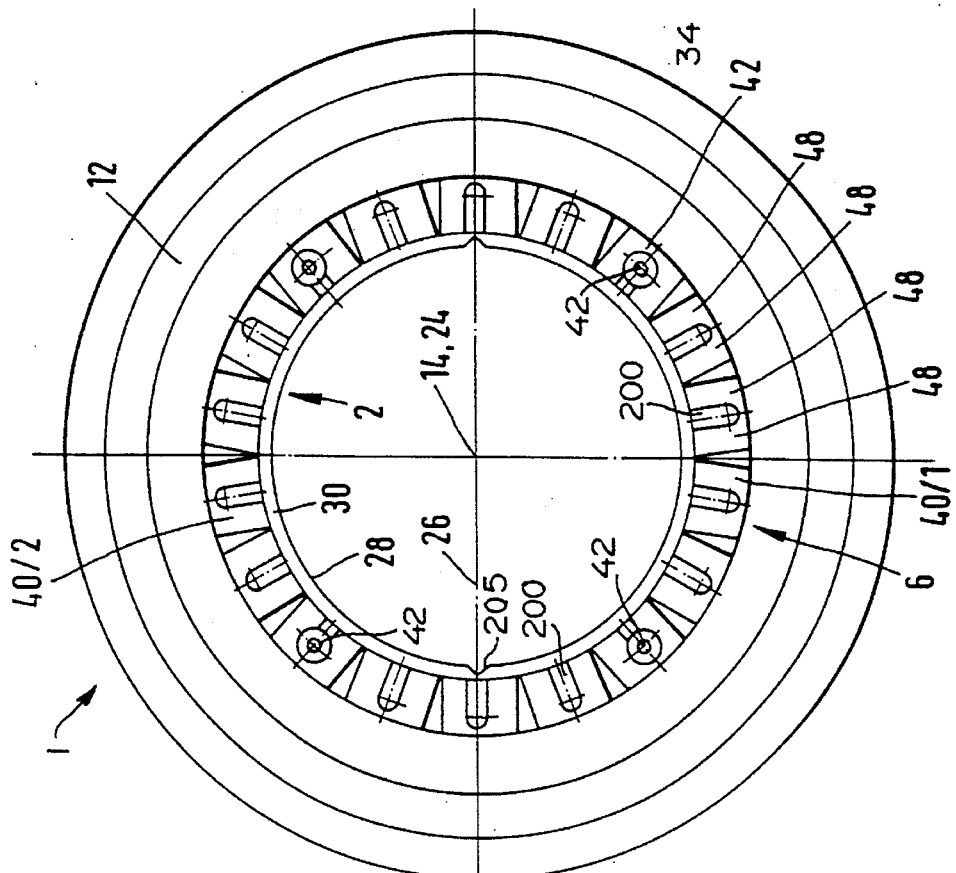
FIG. 1 is a fragmentary longitudinal sectional view through a journal-thrust bearing assembly constructed in accordance with the invention shown carrying a shaft, with a portion of the bearing assembly partially exploded and illustrating a bearing body formed of two segments and a pair of thrust rings removably mounted to opposite axial ends of the bearing body and with the section line of FIG. 1 extending through a mounting screw to better illustrate the engagement of mounting screws.

Referring now in detail to the drawings, the reference numeral 1 denotes generally a journal-thrust bearing assembly constructed in accordance with and embodying the invention. The bearing assembly 1 is positioned to support a rotating shaft 60 having a pair of spaced annular collars 50 which may be formed in one piece with the shaft 60. The bearing assembly 1 includes a sleeve bearing 2 and a pair of thrust bearings 4, 6 with the thrust bearings 4,6, configured and positioned to engage the shaft collars 50 to prevent axial movement of the shaft 60.

The sleeve bearing 2 is formed of a bearing body 12 which is mounted within a bearing support 8. The bearing support 8 includes spherical sector shaped concave support faces 10 against which are seated mating convex faces 16 of the bearing body 12. The spherical center of the concave faces 10 and the convex faces 16 comprises a center point 14 which lies within a horizontal plane 26 coincident with a bearing axis 24. Engagement between the concave support faces 10 of the bearing support 8 and the convex faces 16 of the bearing body permits limited self alignment with the axis of the shaft 60 about the center point 14.

Pursuant to the invention, the bearing body 12 is formed of a suitable metal or plastic in two parts, i.e., an upper and a lower body segment, 18, 20, respectively. The segments, 18, 20 are joined together along the horizontal axial plane 26 by through bolts or a clamp assembly. A sleeve bearing face 28 forms a cylindrical bearing bore 36 within which the shaft 60 is seated.

The sleeve bearing face 28 comprises an inner cylindrical face of a sleeve bearing liner 30 which is formed as a layer of bearing material, preferably a metal alloy, such as white metal or Babbitt metal, which includes, as a component, lead or tin. The liner 30 may be formed of any other conventional bearing materials, including plastics. The liner 30 is applied to the bearing body segments 18, 20 in any conventional manner, such as by spraying, e.g. flame spraying, on to the inner cylindrical surface of the bearing body segments 18, 20. Alternately a sleeve bearing liner 30 need not be employed and the bearing body 12 may be formed of a suitable bearing material which extends radially inwardly to the bearing face 28.

Pursuant to the invention, the bearing assembly 1 carries the thrust bearings 4, 6, within annular wells 32, formed in the outer axial ends of the bearing body 12, concentric with the bearing axis, 24. A seat surface 34 defines the end of each well 32 and provides an abutment surface against which a thrust ring 40 is mounted. Among the materials suitable for employment in fabrication of the thrust rings 40 are plastics, however, other materials such as aluminum alloy, bronze, white metal, Babbitt metal and the like may be utilized. The selection of the material is dependent upon the specified load conditions.

In order to mount the thrust ring 40, suitable axial apertures extend through the thrust ring. Bolts or screws 42 extend through the apertures to engage. threaded sockets 44 formed in the bearing body 12. In FIG. 1, the thrust rings 40 have been rotated 22½ degrees from their actual position to better illustrate the engagement of the screws 42 into the sockets 44.

Each thrust ring 40 is comprised of a lower segment 40/1 and an upper segment 40/2, with the ends of each segment abutting one another at the horizontal plane 26. An axially outwardly facing bearing face 46 of each thrust ring engages one of the shaft collars 50 to preclude axial movement of the shaft 60.

Engagement between the bearing faces 46 and the shaft collars 50 is facilitated through an oil circulation system of the bearing assembly 1 and, in particular, through the employment of a specific contour in the bearing face 46.

Figure 5:
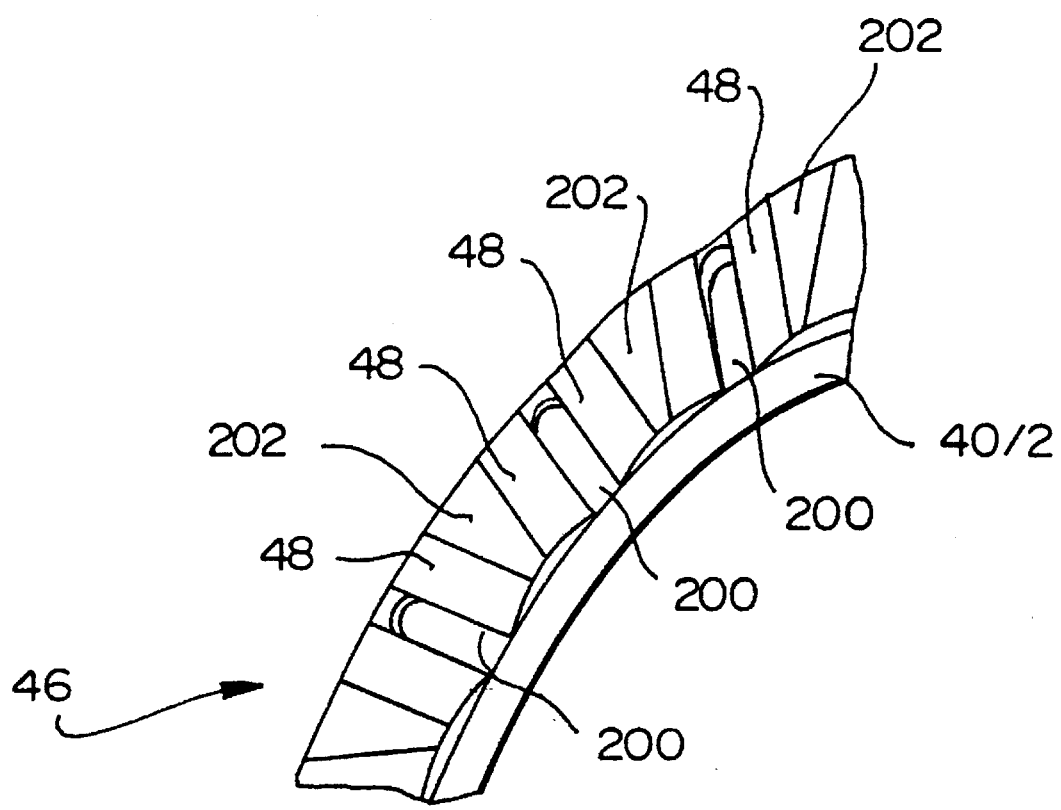
FIG. 5 is a fragmentary perspective illustration of the thrust ring illustrated in FIG. 1 and FIG. 2 illustrating structural details of the contoured face of the thrust ring.

With attention now directed to FIG. 5, wherein a fragmentary perspective illustration of a thrust ring segment 40/2 and its bearing face 46 is illustrated, it should be noted that the bearing face 46 includes a plurality of equidistantly spaced sloped planer oil delivery ramps 48 which extend across the entire radial thickness of the thrust ring 40 and which are positioned between a plurality of spaced radial oil reservoirs 200 (at a minimum axial thickness) and a plurality of spaced planer platforms 202 (at a maximum axial thickness) of the thrust ring 40.

Each of the oil delivery ramps 48 is sloped axially inwardly from the opposite longitudinal edges of the platforms 202 towards its respective oil reservoir 200. The slope is relatively slight, for example, the total difference in axial depth of an oil delivery ramp 48 may be in the order of 1 mm for a circumfrential distance of perhaps 400 mm.

By providing every other oil delivery ramp 48 with an opposite direction of axial slope, the thrust ring 40 is capable of providing a lubricating oil film in contact with the shaft collar 50 in either direction of shaft rotation. If each oil delivery ramp 48 were sloped in the same direction, the delivery of an oil film would be enhanced in one direction of shaft rotation and retarded in the opposite direction of rotation.

Figure 2:
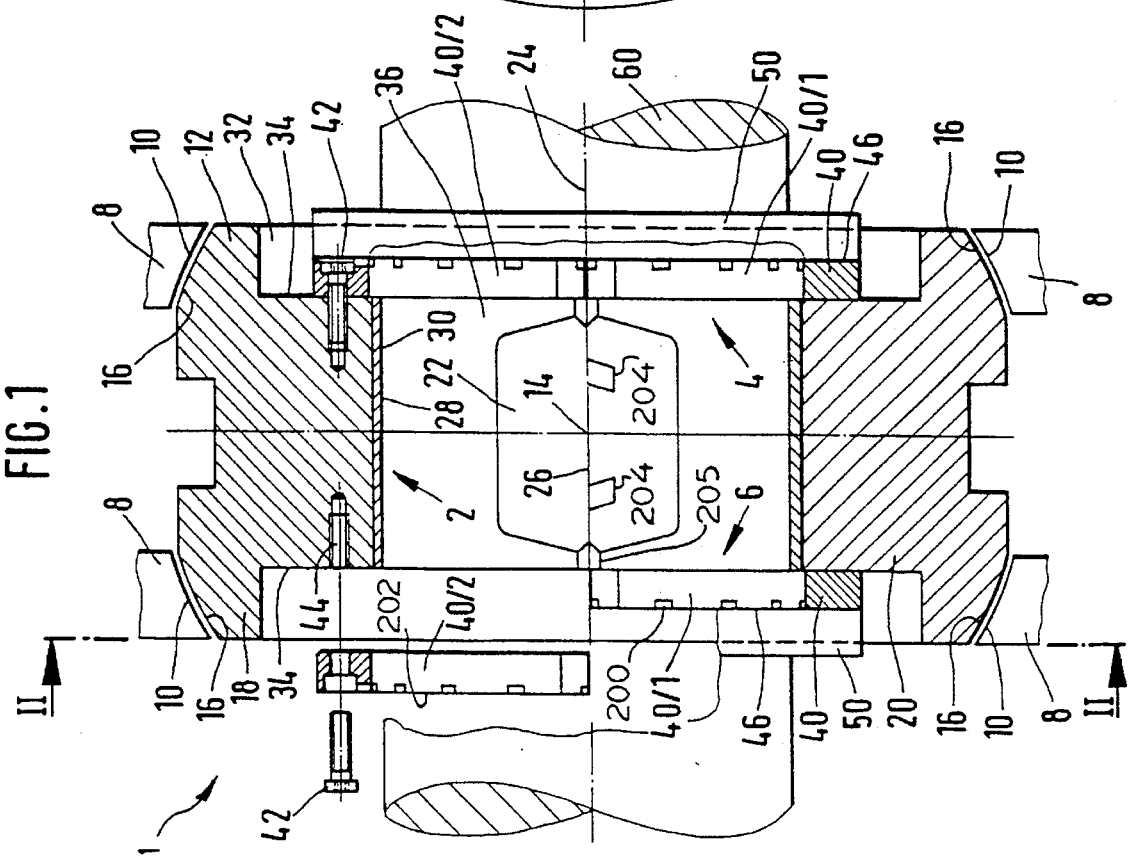
FIG. 2 is an auxiliary view of the journal-thrust bearing assembly, without the shaft, the same being taken substantially along the line II—II of FIG. 1 and illustrating a contoured bearing face of one of the thrust rings.

A more complete understanding of the oil delivery system of the bearing assembly 1 will be obtained from an examination of FIGS. 1 and 2 wherein it will be seen that the upper bearing body segment 18 and the lower bearing body segment 20 include an oil delivery plenum 22 which receives oil through a pair of oil inlet channels 204, formed in the lower bearing body segment 20. The plenum 22 opens against the rotating shaft 60 and oil flows radially to the sleeve bearing face 28 to provide a journal bearing lubrication film at the interface between the bearing face 28 and the shaft 60.

Oil additionally flows from the plenum 22 axially through a pair of channels 205 formed in the liner 30 to the oil reservoirs 200. From the oil reservoirs 200 oil flows axially outwardly along the sloped surfaces of the oil delivery ramps 48 to provide an oil film interface between the collars 50 and the bearing face 46.

It should be appreciated that the bearing assembly 1 can be assembled along the horizontal plane 26 and positioned between the shaft collars 50 for the original application assembly. If it becomes necessary to replace the thrust ring segments 40/1 and 40/2 or to replace the bearing body segments 18, 20, or to repair the sleeve liner 30, the bearing assembly 1 may be disassembled along the horizontal plane 26. Upon disassembly, only the replacement parts required for repair of worn bearing components need be provided.

Figure 4:
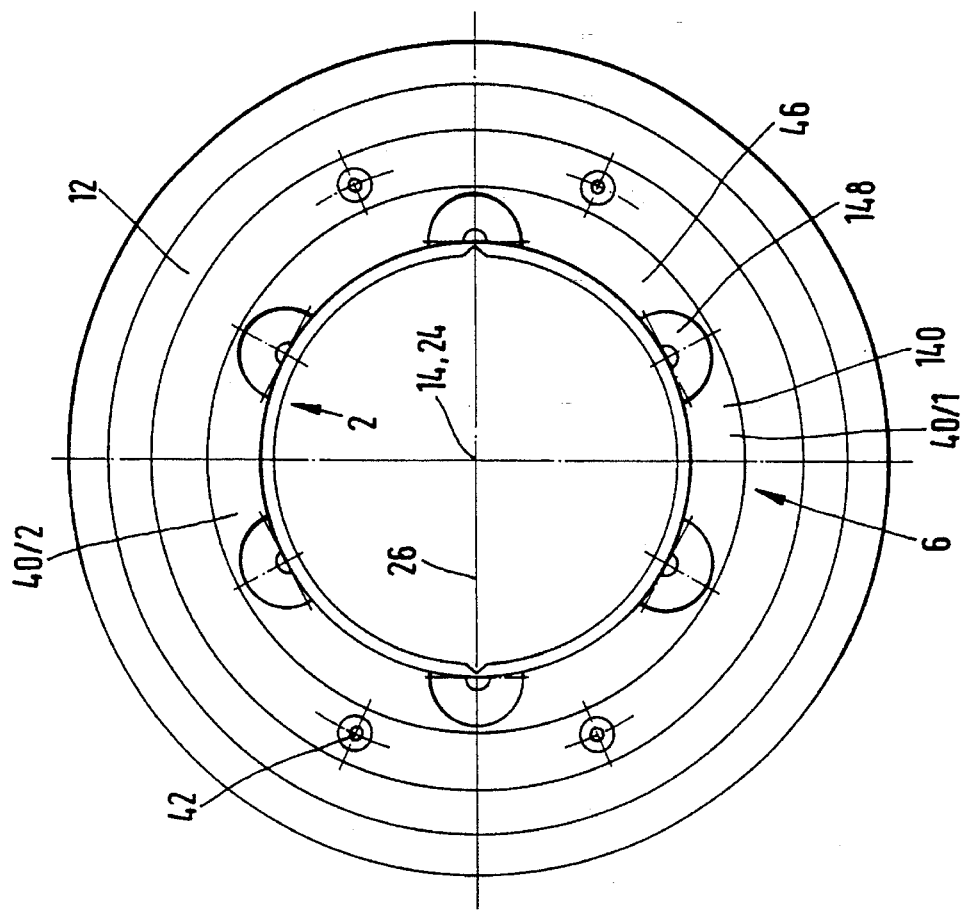
FIG. 4 is an auxiliary view of the journal-thrust bearing assembly of FIG. 3 and illustrating the bearing face of the thrust ring.
Figure 3:
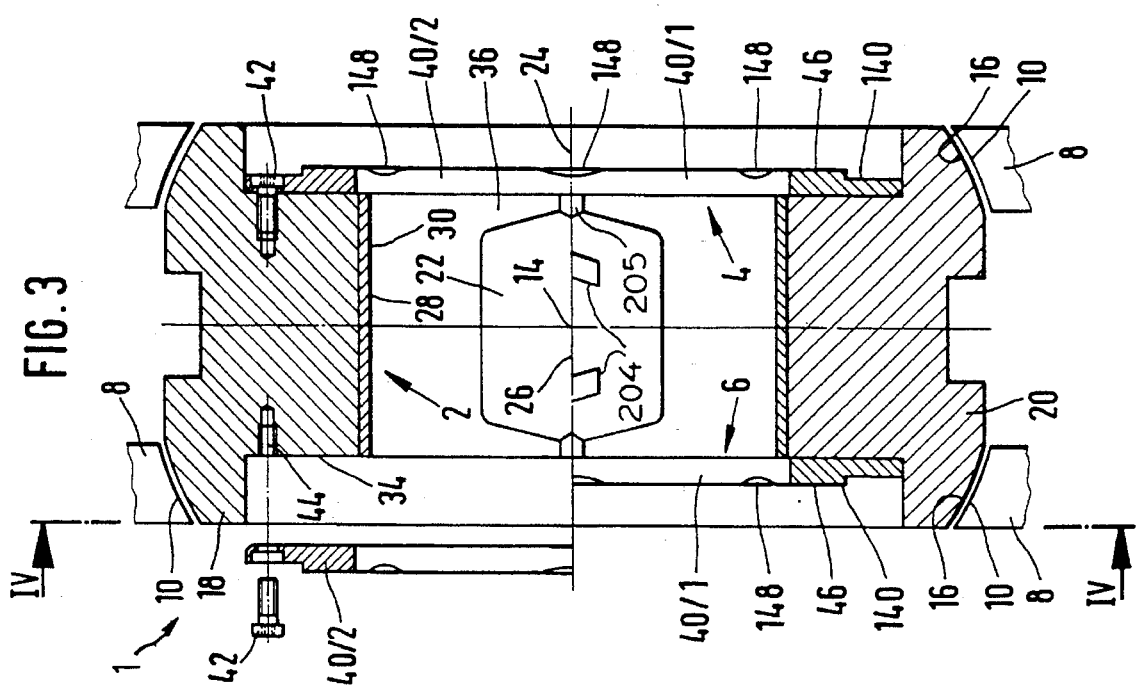
FIG. 3 is a partially exploded sectional view through an alternate embodiment of the journal-thrust bearing assembly wherein the bearing face rings are of the thrust rings of alternate configuration.

Referring now to FIGS. 3 and 4, wherein an alternate embodiment of the invention is disclosed, like numerals have been employed to denote like components as with the embodiment previously described. The alternate embodiment is identical in construction to the embodiment of FIGS. 1, 2 and 5 except, however, with respect to the thrust rings 40 of the previous embodiment.

In this alternate embodiment, a pair of thrust rings 140 are not provided with sloped oil delivery ramps but with a plurality of equidistantly spaced open faced concave oil lubrication pockets 148 which deliver an oil film between a bearing face 46 of each thrust ring 140 and each collar 50 of the shaft 60, in a manner familiar to those of skill in the art.

Additionally, the thrust rings 140 are of a greater radial width than the thrust rings 40 and completely overly the entire seat surface 34 of the annular well 32.

Thus it will be seen that there is described a journal-thrust bearing assembly which achieves the various aspects, features and considerations of the present invention and which is well suited to meet the conditions of practical usage.

As various changes might be made in the journal-thrust bearing assembly above set forth without departing from the spirit of the invention, it is to be understood that all matter herein described or shown in the accompanying drawings is to be interpreted as illustrative and not in a limiting sense.

Having thus describe the invention, there is claimed as new and desired to be secured by Letters Patent:

1. A combination journal-thrust bearing assembly comprising a bearing body formed of a pair of sections joined along an axial plane, means for supporting the bearing body for pivotal movement about a center, the means for supporting including means providing a convex surface on the bearing body, a bearing support and means providing a mating concave surface in the bearing support, the bearing body including a journal bearing having a bearing face, the bearing body including a pair of opposed axial ends, a thrust bearing ring, the ring being formed of at least two sections, the ring sections being joined along the axial plane, screw means for detachably securing the ring against one of the axial ends of the bearing body, the ring having a thrust bearing face, the journal bearing face being formed of a material different from that of the thrust bearing face, the material of one bearing face being plastic and the material of the other bearing face being metal.

2. A combination journal-thrust bearing assembly comprising a bearing body formed of a pair of sections joined along an axial plane, the bearing body including a journal bearing having a bearing face, the bearing body including a pair of opposed axial ends, a thrust bearing ring, the ring being formed of at least two sections, the ring sections being joined along the axial plane, means detachably mounting the thrust bearing ring to one of the axial ends of the bearing body, the ring having a thrust bearing face, the journal bearing face being formed of a material different from that of the thrust bearing face, the journal bearing face defining a journal bore extending along a bearing axis, an oil distribution plenum, the plenum being open to the bore, a radial oil delivery passageway extending through the bearing body to the plenum, an axial passageway extending between the plenum and the thrust bearing ring for delivery of lubricating oil to the thrust bearing face, the axial plane extending through the axial passageway.

3. A combination journal-thrust bearing assembly as constructed in accordance with claim 2 wherein the ring is formed of plastic and the journal bearing face is formed of metal.

4. A combination journal-thrust bearing assembly as constructed in accordance with claim 2 wherein the journal bearing face is formed of plastic.

5. A combination journal-thrust bearing assembly as constructed in accordance with claim 2 the thrust bearing face including a contoured surface for the formation of a lubrication oil film between the thrust bearing face and a collar of a rotating shaft.

6. A combination journal-thrust bearing assembly as constructed in accordance with claim 2 further including means for supporting the bearing body for pivotal movement about a center, the supporting means including means providing convex surfaces on the bearing body, the combination journal-thrust bearing assembly further including a bearing support and means for providing mating concave surfaces in the bearing support.

7. A combination journal-thrust bearing assembly for a rotating shaft having a collar fixed thereto, the bearing assembly comprising a bearing body, means for supporting the bearing body for pivotal movement about a center, the means for supporting including means providing convex surfaces on the bearing body, the combination journal-thrust bearing assembly further including a bearing support and means for providing mating concave surfaces in the bearing support, the bearing body including a journal bearing having a bearing face, the journal bearing face defining a bore extending along a bearing axis, the bearing axis extending through the center, the bore being dimensioned sufficient to accommodate the rotating shaft, the bearing body including a pair of opposed axial ends, means forming a concentric well in one of the axial ends, the well having a depth, the bearing body being formed of two sections joined along an axial plane, the journal-thrust bearing assembly further including a thrust bearing ring, the thrust bearing ring having a thickness less than the depth of the well, the thrust bearing ring being seated in the well, and screws detachably securing the thrust bearing ring to the one axial end, the thrust bearing ring having an axially outwardly directed thrust bearing face, the thrust bearing ring being positioned concentric with the bearing axis and the well, the thrust bearing ring being formed of at least two sections, the two sections being joined along the axial plane, the bearing assembly being adapted to be operatively positioned with the shaft extending through the bore and with the collar engaging the thrust bearing face, the thrust bearing ring being formed of the same material throughout its thickness from the thrust bearing face axially inwardly, the thrust bearing face material being different from the material of the journal bearing face, the bearing body further including an oil distribution plenum, the plenum being open to the bore, means for introducing lubricating oil to the plenum, the means for introducing lubricating oil to the plenum including means forming an oil delivery passageway extending radially through the bearing body, the oil delivery passageway extending to the plenum, the plenum delivering an oil film to a first interface between the shaft and the bore, the assembly further including means for delivery of lubricating oil to a second interface between the thrust bearing face and the collar, the means for delivery of oil to the second interface comprising at least one axial passageway extending between the plenum and the thrust bearing ring, the thrust bearing face including a plurality of pairs of symmetric opposed sloped surfaces, the sloped surfaces of each pair being inclined in opposite directions axially outwardly from a maximum axial depth toward the one axial end.

8. A combination journal-thrust bearing assembly for a rotating shaft as constructed in accordance with claim 1 further including an additional thrust bearing ring and means for detachably mounting the additional thrust bearing ring to the other axial end of the bearing body coaxial with the bearing axis.

9. A combination journal-thrust bearing assembly for a rotating shaft as constructed in accordance with claim 7 wherein the journal bearing face is formed of metal.

10. A combination journal-thrust bearing assembly for a rotating shaft as constructed in accordance with claim 7 wherein the thrust bearing ring is formed of plastic.

11. A combination journal-thrust bearing assembly for a rotating shaft as constructed in accordance with claim 7 wherein the journal bearing comprises a liner, the liner being carried in the bearing body, the liner defining the journal bearing face.

12. A combination journal-thrust bearing assembly for a rotating shaft as constructed in accordance with claim 7 wherein the thrust bearing face further includes a like plurality of radially extending oil reservoirs, each oil reservoir being positioned adjacent the maximum axial depth of a pair of sloped surfaces.

13. A combination journal-thrust bearing assembly for a rotating shaft as constructed in accordance with claim 7 each pair of sloped surfaces comprising a concave oil delivery pocket, the oil delivery pockets facing in an axially outward direction, whereby an oil lubrication film is delivered to an interface between the thrust bearing and the shaft collar.

14. A combination journal-thrust bearing assembly for a rotating shaft as constructed in accordance with claim 1 wherein the journal bearing face is formed of plastic.

15. A combination journal-thrust bearing assembly for a rotating shaft as constructed in accordance with claim 7 wherein each sloped surface comprises a generally planar oil delivery ramp.

16. A combination journal-thrust bearing assembly for a rotating shaft as constructed in accordance with claim 7 wherein the material of one of the bearing faces is metal and the material of the other bearing face is plastic.

17. A combination journal-thrust bearing assembly for a rotating shaft as constructed in accordance with claim 7 wherein the axial plane extends through the axial passageway.

* * * * *